March 23, 1954 — J. K. RUSSELL — 2,672,984
FILTER
Filed April 16, 1952
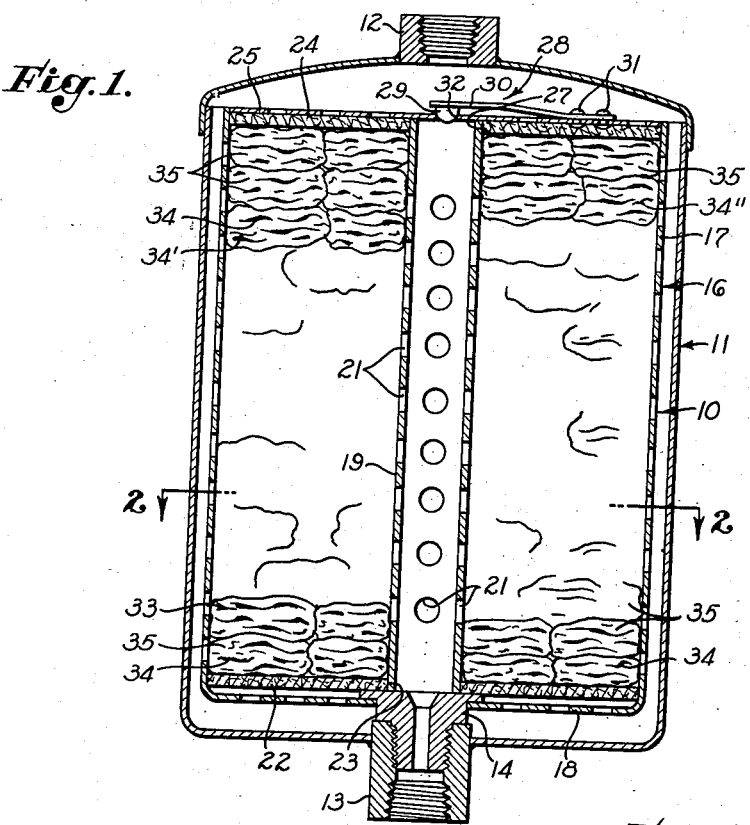
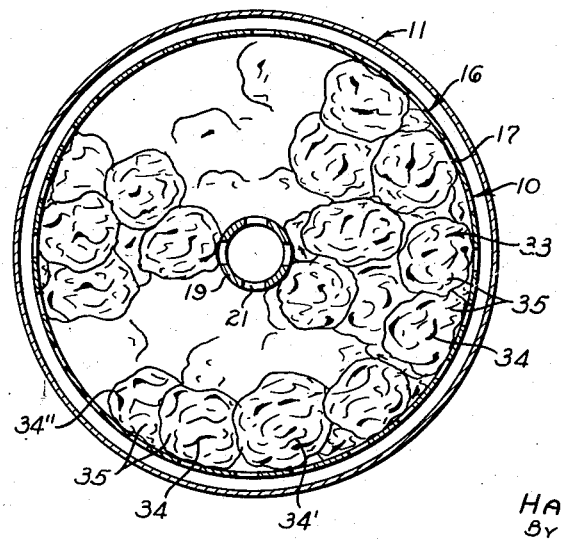
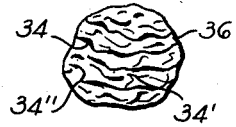
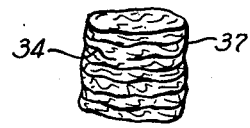
INVENTOR.
JOHN K. RUSSELL
BY HIS ATTORNEYS.
HARRIS, KIECH, FOSTER & HARRIS Patented Mar. 23, 1954

2,672,984

UNITED STATES PATENT OFFICE 2,672,984

FILTER

John K. Russell, Los Angeles, Calif., assignor to Luber-Finer Incorporated, Los Angeles, Calif., a corporation of California Application April 16, 1952, Serial No. 282,531

10 Claims. (Cl. 210—131)

This application is a continuation-in-part of my co-pending application Serial No. 206,105 for "Filter and Method of Making Same," filed January 15, 1951, now abandoned.

This invention relates to improvements in filters and filter elements.

The filter element of my invention is designed particularly for removing foreign matter from fluids and since the fundamental concepts involved are particularly applicable to filters for removing foreign matter suspended in the oil employed for lubricating internal combustion engines, I prefer to consider such embodiments herein for convenience in disclosing the invention. However, since the embodiments considered herein are susceptible of various other applications and since my disclosure will enable those skilled in the art to practice my invention in other forms, it will be understood that I do not intend to restrict my invention to the particular embodiments in the field of application considered herein.

In prior art filter elements it has been conventional to utilize a filter body consisting largely of shredded materials such as paper, cotton, and other conventional filter materials. The utilization of such shredded materials necessitates the provision of fine mesh retaining means for preventing portions of said materials from being carried out of the filter body with the filtered lubricant to the internal combustion engine with which the filter element is associated.

It is, therefore, a primary object of my invention to provide a filter element which incorporates a filter body constituted by a plurality of wads of material of such size that the necessity of providing fine mesh retaining means to prevent the dislodgement of said wads from the filter body into the lubricant being filtered is eliminated.

In conventional filter elements which incorporate a filter body constituted by a mass of shredded filter material, the continued flow of lubricant through the filter body causes the formation of by-pass channels in the filter body through which fluid may be by-passed, resulting in the by-passing of non-filtered lubricant back to the internal combustion engine with which the filter element is associated. By the words "by-pass channels," as used herein, I mean large passages which are accidently formed in the filter body as distinguished from filtering "interstices" and "voids." The by-pass channels are so large as to prevent the fluid from being properly filtered while the interstices and voids are sufficiently constricted to have an effective filtering action and permit sufficient flow to exceed the contamination rate of the engine.

Another object of my invention is the provision of a filter body constituted by a plurality of wads of filter material which are so disposed in relationship with one another that the possibility of the creation of by-pass channels therebetween is eliminated, thus eliminating the possibility of the by-passing of non-filtered lubricant through the filter and its return to the internal combustion engine in unfiltered condition.

An additional object of my invention is the provision of a filter element of the aforementioned type in which the individual wads of filter material which constitute the filter body are so compressed, one against the other, that the entire peripheral surface of any one wad of filter material is substantially contacted by the adjacent peripheries of adjacent wads of filter material to prevent the existence therebetween of by-pass channels through which lubricating fluid can be by-passed, while still permitting the existence of interstices and voids which will have a filtering action while permitting sufficient flow to exceed the contamnation rate of the engine.

A further object of my invention is the provision of a filter element which includes a container, said container having inlet and outlet passages formed therein and including a filter body composed of a plurality of superimposed wads of filter material, said wads of filter material being compressed, one upon the other, to provide a filter body which is substantially homogeneous in nature.

Another object of my invention is the provision of a filter element of the aforementioned type in which the wads of filter material are so compressed, one against the other, that a large number of filtering voids is provided in the filter body. In addition, the total length of the voids is far in excess of the filter area presented by conventional filter bodies.

An additional object of my invention is the provision of a filter element of the aforementioned type which is adapted for use in filtering lubricants under low pressure because it offers little resistance to the flow of lubricants therethrough and because of the large area of filtering surface made available by the filtering voids.

Another object of my invention is the provision of a filter element which includes a container, said container having a bottom wall and a plurality of inlet and outlet orifices, being adapted to receive a plurality of wads of filter material which are superimposed, one upon the other, in a compressed state and which have their longitudinal axes arranged in substantial parallelism with the bottom wall of the container to present a maximum filter area to the flow of lubricant.

An additional object of my invention is the provision of a filter element of the aforementioned type in which the superimposed and compressed wads of filter material are provided with a coating of a chemical precipitant to cause the coagulation of colloidal dispersions in the lubricant and to augment the mechanical filter action of the wads of the filter material.

Other objects and advantages of my invention will be apparent from the following specification and the accompanying drawings, which are for the purpose of illustration only, and in which:

Fig. 1 is a vertical, sectional view of a filter element constructed in accordance with my invention;

Fig. 2 is a transverse, sectional view taken from the broken line 2—2 of Fig. 1;

Fig. 3 is a perspective view of one type of wad of my invention; and

Fig. 4 is a perspective view showing another type of wad which can be utilized in the formation of the filter body of my invention.

Referring to the drawings, and particularly to Figs. 1 and 2 thereof, I show a cylindrical filter element 10 which is disposed in a container or housing 11, the peripheral wall of the housing being spaced from the element to permit flow of oil therebetween. The housing 11 includes an inlet fitting 12 and an outlet fitting 13 to which may be connected suitable inlet and outlet lines (not shown) which may, for example, form part of the oil circulating system of an internal combustion engine. The filter element 10 includes an outlet fitting 14 which may be threadedly inserted into one end of the outlet fitting 13 on the housing 11, the fitting 13 providing the sole connection between the housing and the filter element so that the element may be installed and/or removed readily and so that the flow of lubricant will not be impeded.

The filter element 10 includes a container 16 having a perforated or foraminous peripheral wall 17 and a foraminous bottom wall 18. Disposed centrally of the container 16 and having its longitudinal axis substantially coincident with the longitudinal axis of said container is a tubular member 19, said tubular member being provided with a plurality of orifices 21 which permit the passage of filtered lubricant from the interior of the container 16 to the outlet fittings 14 and 13, respectively, of the filter element 10 and the housing 11. Thus, the openings in the foraminous peripheral wall 17 of the container 16 constitute the inlet openings of the container while the orifices 21 in the centrally located tubular member 19 constitute the outlet openings thereof. Positioned adjacent the foraminous bottom wall 18 of the container 16 is a bottom plate 22, said bottom plate having a centrally located opening 23 provided therein to permit the end of the tube 19 to be disposed therein in contiguity to the upper portion of the outlet fitting 14 of the filter element 10.

A top plate 24 is disposed adjacent the foraminous top wall 25 of the filter element 10, said top wall and said top plate having formed therein a centrally located opening 27 adapted to receive the upper end of the tubular member 19.

The bottom and top plates 22 and 24, respectively, may be slidably mounted on the tube 19 to permit shrinkage of the filter body, to be described below, to be accommodated for although such shrinkage, which is characteristic of conventional filters, has not as yet been encountered because of the compression of the filter body. If the filter body shrinks the oil pressure will force the top and bottom plates, respectively, toward the top and bottom of the filter body.

Positioned on the top wall 25 of the container 16 is a valve means 28 which is constituted, in part, by a valve member 29 supported upon a thermostatic bimetallic arm 30 which is secured at one end to the top wall 25, as by means of rivets 31. The valve member 29 is adapted to cooperate with a valve seat constituted by the periphery of an opening 33 formed in the center of the top wall 25 of the container 16, said opening communicating with the tubular member 19 at the top thereof to provide a by-pass for the lubricating fluid, to prevent the blow-out of the filter element 10. However, it is not intended that the invention be limited to the particular valve means shown since any conventional type of valve may be used and it may be disposed in any portion of the filter element or housing.

When the internal combustion engine with which the filter element 10 is associated is started, the lubricating oil thereof is frequently found to be quite viscous, particularly when the vehicle in which the internal combustion engine is located is operating in localities where low temperatures prevail. Under such circumstances, the passage of this viscous fluid into the filter element 10 might cause the blow-out of the filter and the destruction thereof, together with the passage of the contents thereof into the lubricating system of the engine with deleterious results. This would occur because, unless the valve means 28 were provided, the only outlet for the lubricating oil would be through the filter element 10. However, under such conditions of low temperature the thermostatic arm 30 maintains the valve member 29 out of contact with the valve seat constituted by the peripheral area surrounding the opening 32 and the viscid lubricating fluid is by-passed through the tubular member 19 to the outlet fitting 14 of the filter element 10. As the temperature of the lubricating oil increases with the operation of the engine, it finally reaches a temperature whereby the bimetallic arm 30 causes the valve member 29 to be seated on the valve seat and thus prevents the by-passing of the lubricating oil through the tubular member 19 and causes the lubricating oil to be directed through the filter element 10.

Disposed within the chamber constituted by the peripheral side wall 17 of the container 16 and the peripheral wall of the tubular member 19 is a filter body 33, the lubricating fluid being filtered through the filter body 33 to remove contaminants therefrom. The filter body 33 includes a plurality of pellets or wads 35 of filter material and thus constitutes a compacted mass of crumpled paper which, in its crumpled form, presents a large multiplicity of sharply defined folded and free edges of the wads as well as point-like intersections of the edges, all in random arrangement. The material forming the wads is preferably of a fabric or fibrous nature to resist disintegration by the oil or other liquid, and may, for example, be any commercially available paper suitable for use in filtering a particular liquid. Tests have indicated that the best results are obtainable using a quality of paper having an unfinished or unglazed surface. Preferably, therefore, the wads are formed of newsprint paper or 100% ground paper stock of about newspaper weight.

In referring to the paper of the wads as being crumpled, it is desired to distinguish clearly between paper that is crumpled or crushed in a manner and to a degree which transforms the sheet into a body which assumes the general shape of a solid geometrical body by reason of the paper being creased and folded on or about itself, as contrasted with paper converted to other forms, such as a shredded condition. Whereas, the latter is ineffective with respect to the retention of subcolloidal carbons and dirts, the paper in the crumpled form contemplated by the invention is highly effective in removing such foreign particles. I further distinguish the present filter medium from others employing a paper or fabric in a condition such that the oil is caused to pass only through the filter or fabric. The present filter medium functions in a manner such that the oil does not only pass through the crumpled paper sheets themselves, but also past and in contact with the folded and irregularized surfaces.

The wads 35 provide a plurality of interstices or voids 34 on the surfaces and in the interiors thereof. The voids 34 are constituted by folds in the wads 35 and a large number of such voids is provided in each wad. Each of the voids provides a relatively large filtering area and thus the filter element is able to effectively filter lubricants under low pressure.

The crumpled surface configuration of the wads 35 presents a large number of folded and free edges 34', all in random arrangement with point-like irregularities at 34'' where the edges intercept. Between the points and edges the filtering interstices and voids 34 are formed within which the separated solids collect on the void-defining surfaces of the paper. Thus, considering the volume of an individual wad in its crumpled form, it presents a large paper surface area for accumulation of impurities from the oil.

When the wads of filter material are originally inserted in the container 16 they may be of any desired configuration, that is, in the shape of balls such as the ball-shaped wad 36, shown in Fig. 3 of the drawings, or in the shape of the disc-shaped wad 37, as best shown in Fig. 4 of the drawings. As will be described in greater detail below, when the wads are originally deposited within the interior of the container 16, they are in a relatively expanded state and a large number of channels exist between the peripheries of adjacent wads. However, subsequently to the deposition of the wads in the container 16, they are compressed somewhat to form a fairly compact mass retained between the plates 22 and 24, as shown in Fig. 1 of the drawings, and to provide a filter body 33 which is of substantially homogeneous character throughout. The manner in which this compression takes place is described in greater detail in my co-pending application, Serial No. 206,105, now abandoned. However, it should be noted that the fact that the individual wads are placed under compression and are so retained in such compressed condition by means of the top wall 25 not only provides a filter body 33 of substantially homogeneous character and of equal and uniform filtering characteristics throughout every portion thereof, but also permits the individual wads to expand slightly to allow for the shrinkage in dimensions or the collapse of adjacent wads. Thus, the filter body 33 has an inherent resilient characteristic imparted to it by the compression of the wads constituting the filter body and this compression of the wads permits a certain amount of expansion thereof to accommodate for changes in the characteristics of the wads during the use thereof.

In addition, the resilient characteristic of the filter body 33 permits the filter body to resist blow-out induced by the increased viscosity of the fluid filtered thereby since the filter body, due to its slightly resilient nature, is able to absorb, to a certain extent, the load imposed by fluids of increased viscosity which would result in the blow-out conventional filter bodies. In addition, when conventional filter bodies are subjected to continuous use, there is a tendency for by-pass channels to become established through the filter body, the by-pass channels being progressively enlarged as the liquid is filtered therethrough, thus resulting eventually in the by-passing of considerable amounts of liquid through the filter without the filtration thereof. However, in a filter body constructed in accordance with my invention, the tendency to create by-pass channels which will ultimately result in the by-passing of fluid is eliminated because of the resilient characteristic of the individual wads constituting the filter body. Thus, the voids and interstices for the liquid cannot become excessively enlarged because of the compression exerted upon each of the wads by the presence of contiguous wads which continually tend to retain the adjacent wads in a predetermined configuration and which will also absorb slight collapses and physical changes in adjacent wads.

The provision of the voids 34 by the wads 35 in such large numbers and in such great length, permits the provision of a filter body which is particularly adapted for filtering lubricants under low pressure because the filter body 33 offers a minimum of resistance to the flow of lubricant. Furthermore, the extreme lengths of the voids 34 in the wads 35 permit a mechanical settling out of the impurities in the lubricant as it flows through the voids. In addition, particles of impurities deposited in the voids serve to attract similar particles entrained in the lubricant as it flows through the voids. The impurities are deposited in the interstices and voids within the wads and, by reason of the accumulated capacities of such spaces, a single filter unit will be found capable of efficient use over an extended period of time.

Good results have been obtained using crumpled paper wads of various sizes, particularly within the range of about ¼ in. to 1 in. in diameter. The size of the paper sheet utilized in forming each of the wads is governed, to a certain extent, by the ultimate size of the wad desired, other controlling factors being the type of paper utilized and the amount of pressure applied to the wad mass to compact same when deposited in the filter element housing. To obtain wads whose ultimate sizes are approximately within the range of ¼ in. to 1 in. in diameter, sheets of newsprint paper and other types of filter material such as blotting paper, kraft paper, sulfite paper, deadening felt, etc., varying in size from 5 sq. in. to 2 sq. ft., have been utilized. For instance, the utilization of 1 sq. ft. of newsprint paper and an applied pressure of approximately 200 p. s. i. results in a wad having a size of approximately ½ in. in diameter.

As previously indicated, it is necessary, in order to avoid by-pass channels between the individual wads, that the wads be compressed, one upon the other, sufficiently to eliminate the possibility of the existence of, or formation of, such by-pass channels. However, excessive pressures great enough to eliminate the filtering voids and interstices in the bodies of the wads must not be utilized. In compressing wads formed from 1 sq. ft. of newsprint paper, I have utilized pressures of approximately 200 p. s. i. and found that the filtering characteristics of a filter element so formed have been maintained without excessive by-passing. With other sizes of wads and with different types of filtering material, I have utilized pressures extending in the range from 50 p. s. i. to 500 p. s. i.

I claim as my invention:

1. An oil filtering element capable of removing colloidally suspended particles in oil being filtered, comprising a receptacle containing an oil-passing compacted mass of pellets each having a dimension through the pellet of at least about one-quarter inch and being formed of newsprint paper crumpled to present sharply defined outer folded edges and oil penetrable voids formed by the paper folds and extending deeply into the pellet between said edges and between the inter-contacting surfaces of the pellets, the oil being filtered passing over and in contact with the surfaces of the paper and carbonaceous particles being depositable from the oil on opposite surfaces of the paper within the voids.

2. An oil filter element as defined in claim 1, having a generally cylindrical receptacle containing apertures through which the oil flows transversely of the receptacle axis into the pellet mass.

3. An oil filter element capable of removing colloidally suspended particles in oil being filtered comprising a receptacle containing an oil-passing compacted mass of pellets each formed of a single sheet of newsprint paper having a surface attraction for the particles, said attractive surface being formed by having the paper crumpled initially into generally ball-shaped form within the size range of about one-quarter to one inch in diameter, each pellet having outer folded edges and oil penetrable voids formed by the paper folds and extending into the pellet between said edges, the oil being filtered passing over and in contact with the surfaces of the paper and carbonaceous particles being deposited from the oil on opposite surfaces of the paper within the voids.

4. In an oil filter element for removing contaminants and colloidally suspended particles from an oil being filtered, the combination of: a receptacle; and an oil passing compacted mass of pellets in said receptacle, each of said pellets being formed from a sheet of paper having an unfinished surface and crumpled to present sharply defined outer folded edges and oil penetrable voids formed by the paper folds and extending deeply into said pellet between said edges, the oil being filtered by passing over and in contact with the surfaces of the paper defining said voids, and carbonaceous particles and other contaminants being depositable from the oil on said surfaces within said voids.

5. In an oil filter element for removing contaminants and colloidally suspended particles from an oil being filtered, the combination of: a receptacle; and an oil passing compacted mass of pellets in said receptacle, each of said pellets being formed from a single sheet of paper having an unfinished surface, said pellets being crumpled into generally ball-shaped form and having outer folded edges and oil penetrable voids defined by the paper folds and extending into the pellet between said edges, the oil being filtered passing through said voids and in contact with the surfaces of the paper defining said voids to deposit upon said surface carbonaceous particles and other contaminants contained in the oil.

6. In an oil filter element for removing contaminants and colloidally suspended particles from an oil being filtered, the combination of: a receptacle; and an oil passing compacted mass of pellets in said receptacle, each of said pellets being formed from a sheet of newsprint paper crumpled to present sharply defined outer folded edges and oil penetrable voids formed by the paper folds and extending deeply into said pellet between said edges, the oil being filtered by passing over and in contact with the surfaces of the paper defining said voids, and carbonaceous particles and other contaminants being depositable from the oil on said surfaces within said voids.

7. In an oil filter element for removing contaminants and colloidally suspended particles from an oil being filtered, the combination of: a receptacle; and an oil passing compacted mass of pellets in said receptacle, each of said pellets being formed from a single sheet of newsprint paper, said pellets being crumpled into generally ball-shaped form and having outer folded edges and oil penetrable voids defined by the paper folds and extending into the pellet between said edges, the oil being filtered passing through said voids and in contact with the surfaces of the paper defining said voids to deposit upon said surfaces carbonaceous particles and other contaminants contained in the oil.

8. An oil filter element as defined in claim 4 in which said receptacle is of generally cylindrical configuration and contains apertures through which the oil flows transversely of the receptacle axis into the pellet mass.

9. An oil filter element as defined in claim 5 in which said pellets are treated with a chemical precipitant.

10. An oil filter element as defined in claim 6 in which said receptacle is of generally cylindrical configuration and contains apertures through which the oil flows transversely of the receptacle axis into the pellet mass.

JOHN K. RUSSELL.

References Cited in the file of this patent

UNITED STATES PATENTS

| Number | Name | Date |
|---|---|---|
| 2,116,537 | Miller | May 10, 1938 |
| 2,369,857 | Russell et al. | Feb. 20, 1945 |